No. 810,715. PATENTED JAN. 23, 1906.
W. CHURCHILL.
METHOD OF INTENSIFYING THE COLORS OF SIGNAL LIGHTS.
APPLICATION FILED OCT. 17, 1905.
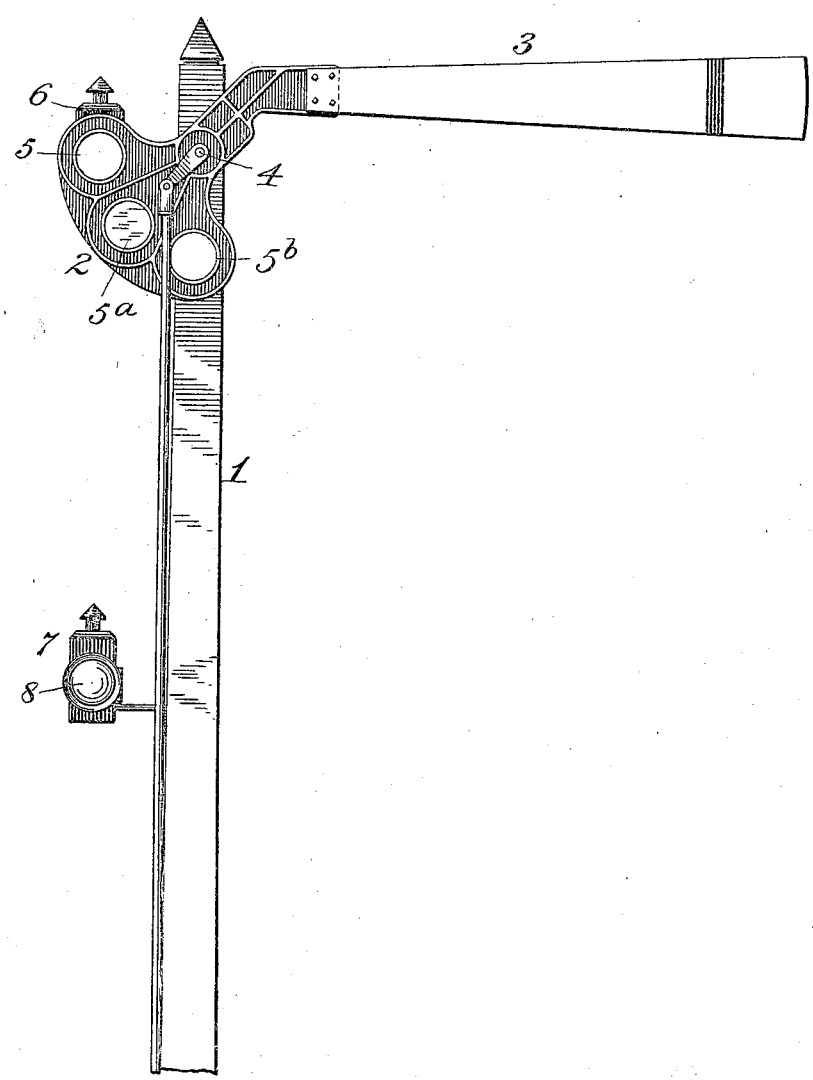
Witnesses
Inventor
William Churchill,
by
Attorneys

UNITED STATES PATENT OFFICE.

WILLIAM CHURCHILL, OF CORNING, NEW YORK, ASSIGNOR TO CORNING GLASS WORKS, OF CORNING, NEW YORK.

METHOD OF INTENSIFYING THE COLORS OF SIGNAL-LIGHTS.

No. 810,715.     Specification of Letters Patent.     Patented Jan. 23, 1906.

Application filed October 17, 1905. Serial No. 283,135.

*To all whom it may concern:*

Be it known that I, WILLIAM CHURCHILL, a citizen of the United States, residing at Corning, in the county of Steuben and State of New York, have invented new and useful Improvements in Methods of Intensifying the Colors of Signal-Lights, of which the following is a specification.

My invention relates to an improved method of intensifying colors displayed by signal-lamps.

This improvement is of wide application, but is especially useful on railroads, whereby the night signals are rendered more distinct, certain, and readily distinguishable from other lights which may and are known to frequently mislead railroad employees, with disastrous results.

The improvement is, however, equally applicable to marine and other uses; but in the following description its adaptation to railroad practice has been adopted in illustration of one practical and effective manner in which the invention may be carried out.

It has long been the practice in railroad signaling to use for the indications at night beams of light of different colors produced either by making use of lenses of the various colors required—such as red, green, yellow, &c.—or by using a clear flint lens for projecting a beam of approximately parallel rays through pieces of colored glass technically known as "roundels," because usually round in shape, inserted in openings in the casting, termed the "spectacle," and which balances the semaphore-arm on the opposite side of the pivot upon which the arm is hinged. As the blade is moved up and down the spectacle is similarly, though in reverse direction, moved back and forth, so that each of the several colored glasses may at the will of the operator rest in front of the lens of the semaphore-lamp and a beam be projected through it from the light. In many instances a single arm, with a spectacle containing the combination of colors used, is employed. Such a device is generally called a "one-armed" indication.

It is a well-known principle of color theory or chromatics and of the psychology of color that two colors, whether lights or reflecting-surfaces, when exhibited in close proximity very materially alter each other's appearance. A light of any given hue when combined in proper proportion with a light of a certain different hue produces a white light. Such colors are called "complementary" and are more distinctly different in hue than any two colors not complementary. Thus red and a bluish green are complementary colors, red and orange or red and purple are not and are more similar in hue than the first-named pair. When two complementary colors are exhibited closely together, both appear to be more thoroughly saturated—that is, more intensely vivid in effect. To illustrate: If red and bluish green are shown together, the red appears more vividly and distinctly red, and similarly the bluish green appears of a more saturated hue. When two colors not complementary are shown together, the effect is to change the apparent hue of both colors, so that they seem more nearly complementary—that is, more distinctly different in hue—than when viewed singly. For example, when orange and red are shown together the effect is to make the red appear more vividly red—that is, more distinctly different from the orange—and to make the orange look yellower—that is, less close to the red in hue—than when seen alone. This principle of contrast has never been employed, so far as I am aware, to render the color value of the signal indications more distinct. It is proposed under my present invention to take advantage of this principle of contrast.

In the further description which follows reference is made to the accompanying drawing, which illustrates a practical mode of corrying out my invention by the employment of a semaphore-signal having a one-armed indication.

Premising that the following description is only given illustratively and is in no sense intended to limit this invention to such explained application of it, upon the semaphore-pole 1, at a distance of, say, six or eight feet below, above, or sidewise from the point at which the blade 3 and the spectacle-casting 2 are hinged at 4, is placed an auxiliary lamp 7, shown as having a lens 8, the lamp being supplemental to the ordinary semaphore-lamp 6. The auxiliary lamp 7 shows constantly one fixed color and serves in some sense as a guide-light to make more definable the character of the signal colors shown in conjunction with it, and thus providing at the same time a double signal which it is practically impossible to confuse with neighborhood lights or other nearby signals, such as lights in houses near the track or in signal-towers that in the past have been frequently mistaken and with fatal results for the semaphore-lamp. The color of the beam to be projected by the auxiliary lamp 7 should be such as to show off most effectively by contrast the various signal colors displayed above or below it.

Let it be assumed that the roundel 5 is red, 5ª lunar-white, and 5ᵇ green. Now the lens 8 in the auxiliary lamp may be yellow, which by contrast will intensify the hues of the signal colors displayed above it. The four long range signal-color glasses, which can be employed with a kerosene-flame, are red, yellow green, and a pale-blue glass producing a bluish-white light, commonly known as the "lunar-white." Either one of these four may be employed for the auxiliary light mentioned. The best results would probably be secured either from the use of the lunar-white or the yellow; but it is perfectly possible to use red or green.

It is to be understood that regardless of the colors used the broad principle underlying my invention is that of enhancing the effect of a displayed signal-light by means of the law of color contrast, whereby the hues of the respective signals exhibited are rendered more vivid and distinct than heretofore known in the art of night signaling.

Owing to the increase in distinctness secured by the contrasting or auxiliary lamp it is possible where desired to use lighter reds, greens, &c., than could otherwise be displayed, the effect produced by the contrast compensating for the loss of distinctness incidental to the use of a lighter or less saturated tint of glass.

Continuing the illustration of a practical way in which my invention may be carried out in railroad practice, it is considered highly desirable by signal engineers to provide at least three distinct night signals to indicate "danger," "caution," and "safety;" but the only two thoroughly satisfactory single colors available are red and green. Where yellow is is used alone as a third signal, it is liable to be confused with neighborhood lights, and where the lunar-white is employed there is danger of a slight confusion with an electric arc; but when the color displayed is always shown by contrast with a fixed light the differences in color are so much more marked that three distinct signal combinations are available, no one of which is of short range or liable to give rise to confusion. The fact that the application of this principle makes three distinct signals possible is of the highest importance. Although yellow or clear flint is often used as a third signal, it has never been felt by signal engineers that it, when used alone, is satisfactory, and although the lunar-white probably gives a more distinct indication than the yellow yet no one-light combination can be as effective as a two-light combination.

Under certain meteorological or atmospheric conditions, such as those incident to fogs, smoke, &c., the hues of signal-lights are known to be materially changed, and under such common conditions the advantages of my invention are especially noticeable. Thus under such conditions a yellow light is liable to be given a reddish tint; but if it is displayed in conjunction with a red signal the latter, and, indeed, both, will by distinction or contrast be instantly recognized.

Having thus described my invention, I claim—

1. The within-described mode of intensifying the colors and thereby increasing the efficiency of signal-lights for railroad, marine and other services, the same consisting in exposing in proximity to a signal-light of a given color a second light of constant color which shall by contrast produce the described effect, substantially as set forth.

2. The within-described mode of increasing the efficiency of signal-lights, the same consisting in exposing, at a predetermined distance from a signal-lamp displaying different colors for different indications, a second light exhibiting a color which shall, by contrast, intensify and render more vivid the several colors displayed, substantially as set forth.

In testimony whereof I affix my signature in presence of two witnesses.

WILLIAM CHURCHILL.

Witnesses:
GEORGE H. HOWARD,
C. B. BULL.